United States Patent [19]

Sakurai et al.

[11] Patent Number: 4,862,777
[45] Date of Patent: Sep. 5, 1989

[54] METHOD AND APPARATUS FOR FORMING SURFACES ON PISTON RINGS

[75] Inventors: Shigeo Sakurai; Masayuki Onimaru, both of Saitama, Japan

[73] Assignee: Honda Giken Kogyo Kabushiki Kaisha, Tokyo, Japan

[21] Appl. No.: 22,084

[22] Filed: Mar. 5, 1987

[30] Foreign Application Priority Data

Mar. 5, 1986 [JP] Japan .................................. 61-48035
Mar. 5, 1986 [JP] Japan .................................. 61-48036

[51] Int. Cl.⁴ .............................................. B23B 3/00
[52] U.S. Cl. ......................................... 82/122; 82/18; 82/131; 82/169; 29/269; 29/156.63; 279/2 A
[58] Field of Search ................... 82/1 C, 2 D, 2 E, 18, 82/43, 44; 29/156.63, 156.6, 269; 51/290; 279/2 A, 2 R, 4; 269/47; 409/166–168, 200

[56] References Cited

U.S. PATENT DOCUMENTS

| | | | |
|---|---|---|---|
| 1,024,882 | 4/1912 | Domizi | 279/2 A |
| 1,118,784 | 11/1914 | Lanchester | 29/156.63 |
| 1,139,650 | 5/1915 | Domizi | 279/2 A |
| 1,494,913 | 5/1924 | Hughes | 29/156.63 |
| 3,165,011 | 1/1965 | Kelly | 82/18 |
| 4,198,066 | 4/1980 | Deprez et al. | 82/44 |
| 4,520,700 | 6/1985 | Herzog et al. | 82/31 |
| 4,564,914 | 1/1986 | Ballough et al. | 82/1 C |

*Primary Examiner*—Frederick R. Schmidt
*Assistant Examiner*—Robert Showalter
*Attorney, Agent, or Firm*—Lyon & Lyon

[57] ABSTRACT

Apparatus is described for machining the exterior peripheral surface of piston rings for internal combustion engines, particularly piston rings having a transverse shape other than circular, for example, oval or elliptical. A jig arrangement usable with the apparatus is adapted to temporarily deform the workpieces in order to produce exterior surfaces having a conical taper.

4 Claims, 6 Drawing Sheets

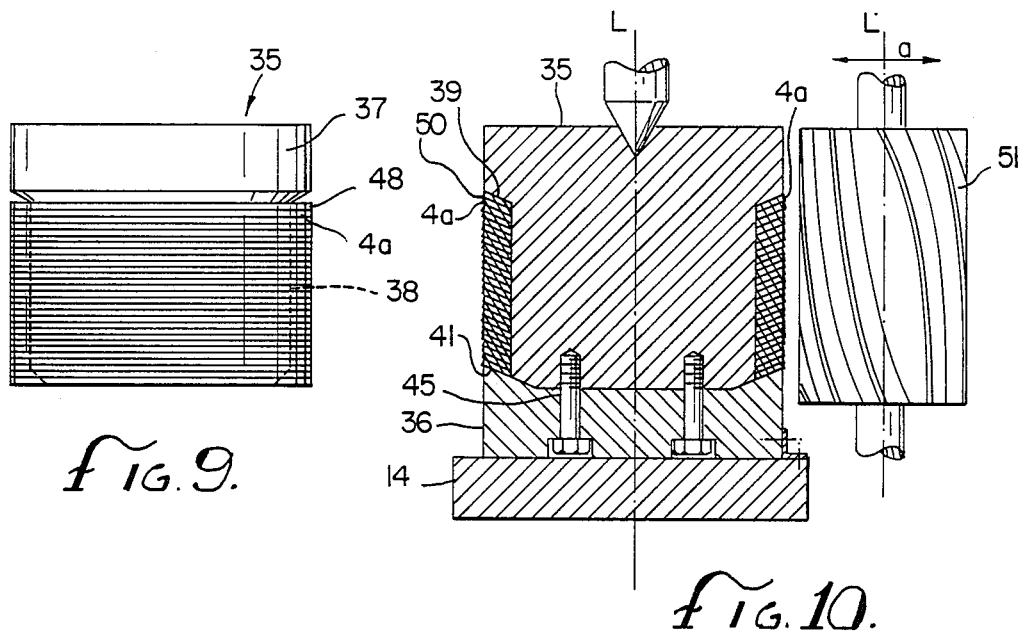
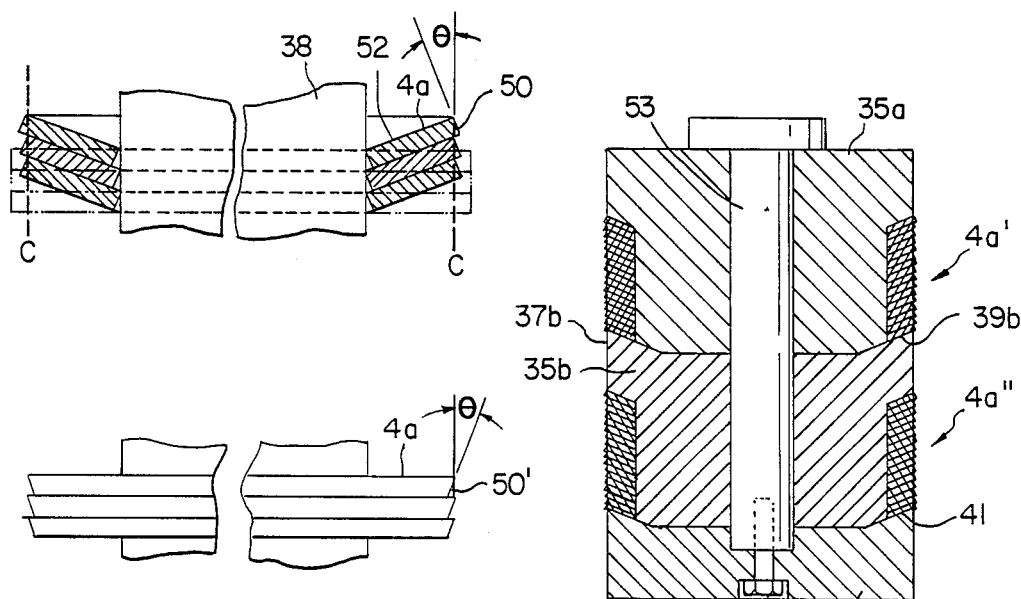

4,862,777

METHOD AND APPARATUS FOR FORMING SURFACES ON PISTON RINGS

BACKGROUND OF INVENTION

The field of the present invention is the production of piston rings for use in internal combustion engines.

In conventional internal combustion engines, pistons are employed which typically include a circular transverse sectional shape. Piston rings used with such pistons are themselves circular and are easily formed. The exterior surface of such rings may be easily finished by simply rotating a stack of piston ring blanks about the axial centerline thereof while applying a cutting tool to the exterior surface.

Internal combustion engines have also been developed which employ cylinders and pistons located therein which are noncircular in transverse section. These cylinders are elongated in plan in order to accommodate the more efficient intake and exhaust valve arrangement providing greater effective port area. One such device is illustrated in U.S. Pat. No. 4,350,126, granted Sept. 21, 1982 to Shoichi Honda, the disclosure of which is incorporated herein by reference. The corresponding piston rings for such noncircular pistons are, of necessity, also noncircular, being oval, elliptical or otherwise of an elongated shape. Consequently, the exterior surface of such rings cannot be formed by the aforementioned conventional procedure.

In certain circumstances, piston rings have been used which employ an external peripheral surface that is conically tapered. The foregoing problem of not being able to easily machine piston rings of noncircular plan is compounded in that the ring blanks cannot be coaxially stacked in a single jig. Instead, they must be stacked with spacers in between each ring blank. Specialized rotary cutting tools having a series of precisely formed cutting teeth of conical shape have been employed. Such devices are illustrated in FIG. 7. Processing the piston ring blanks in this manner to achieve a conical exterior surface is disadvantageous because of the required effort to assemble and disassemble the blanks and spacers from the jig and because of the expensive tooling required.

SUMMARY OF THE INVENTION

The present invention is directed to an improved method and apparatus for the production of piston rings for internal combustion engines. According to a first aspect of the present invention, rings of noncircular plan may be finished through controlled displacement of a cutting tool relative to angular orientation of the work piece. To this end, the apparatus may include a jig rotatable about an axis normal to the plan of the ring blank. A cutting tool may be controlled to move perpendicular to that axis relative to the angular orientation of the jig. The jig may further include mechanisms to enhance the location and removal of pluralities of work pieces.

According to a second aspect of the present invention, method and apparatus are provided capable of machining a conical taper on the exterior peripheral surface of piston ring blanks. To this end, a jig may be employed having a reduced diameter portion with a transverse sectional shape conforming to the internal shape of the ring blanks to be processed. The blanks, being flat, relatively thin, cylindrical members are relatively resilient to movement of the inner periphery axially relative to the outer periphery. The jig may employ this resilience by providing outwardly extending conical faces, between which may be positioned the ring blanks. Distortion of the blanks between the conical faces is such that, when deformed, a cylindrical surface may be machined from the exterior surface of the ring blanks. When released, the exterior surface of each ring assumes a conical configuration.

It is, therefore, an object of the invention to provide a method and apparatus for production of ring-shaped workpieces, such as piston rings for internal combustion engines. For a better understanding of the invention, its operating advantages and the specific objectives obtained by its use, reference is made to the accompanying drawings and description that relate to the preferred embodiments thereof.

BRIEF DESCRIPTION OF THE DRAWINGS

FIG. 9 is an elevational view illustrating stacked workpieces mounted on the jig of FIG. 8 prior to assembly thereof;

FIG. 10 is a partial sectional elevation illustrating the jig of FIG. 8 with workpieces assembled thereon and operationally positioned with respect to a tool;

FIG. 11 is an enlarged sectional view illustrating the condition of the workpieces during the machining process;

FIG. 12 is an enlarged elevational view illustrating the workpieces following machining; and FIG. 13 is a sectional elevational view of another embodiment of a jig for practicing the invention method.

DESCRIPTION OF THE PREFERRED EMBODIMENT

With particular regard to FIGS. 1 to 4, the illustrated internal combustion engine includes a piston 1 whose transverse sectional shape is non-circular, being formed with an oblong cylinder curvature obtained by joining points spaced distally in a direction normal to a reference curve having continuous curvature. Pistons having a transverse section that is substantially oval or elliptical may also be employed. On the peripheral surface of the piston 1, are formed a plurality of parallelly disposed grooves 2 for reception of piston rings 3.

Figure 1:
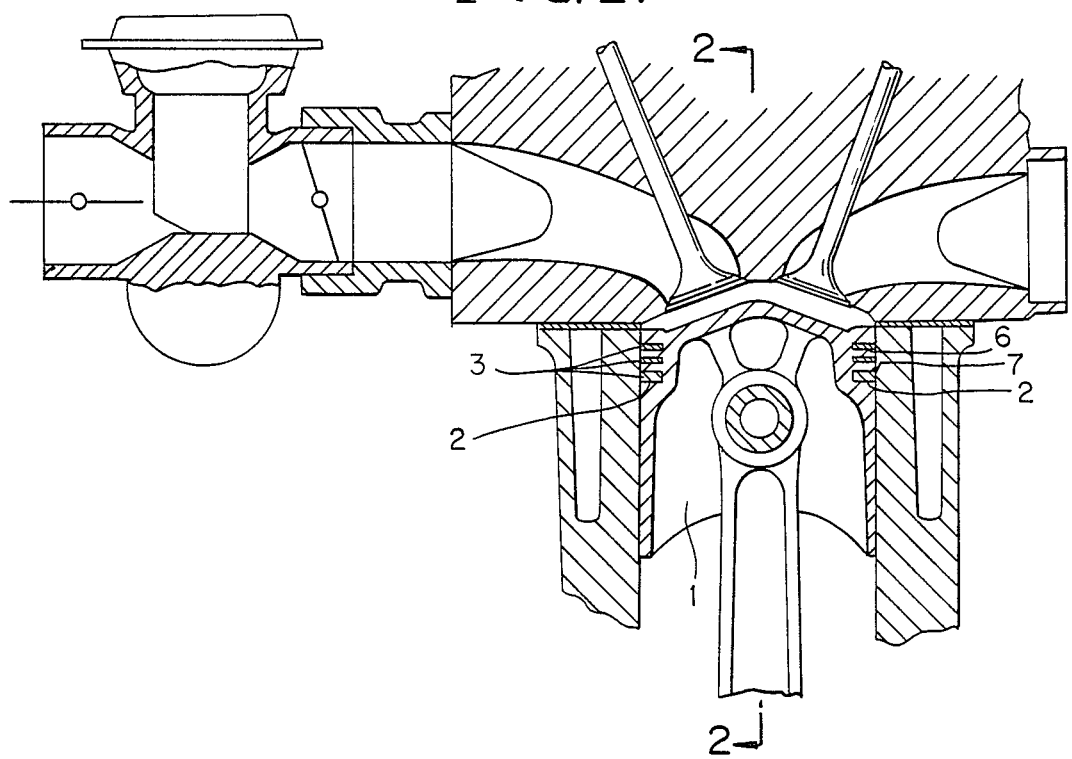
FIG. 1 is an elevational section of an internal combustion engine employing a piston and cylinder of non-circular transverse section.
Figure 2:
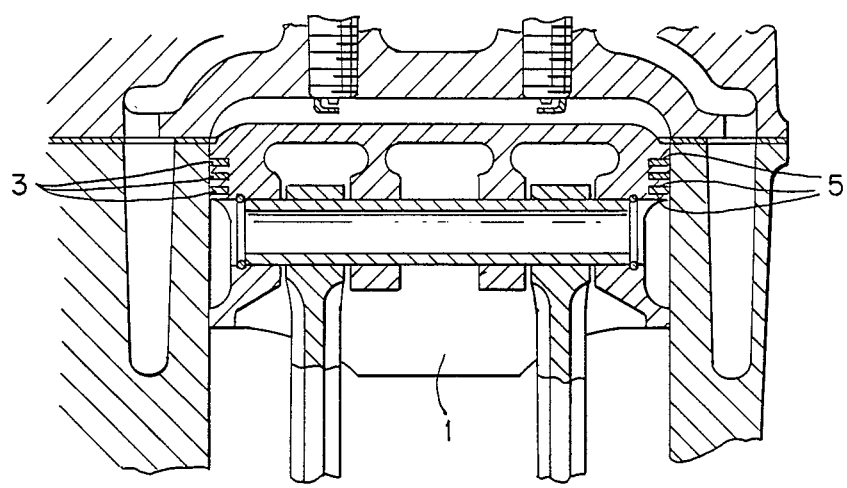
FIG. 2 is an elevational section of the engine of FIG. 1 taken along line II—II of FIG. 1.
Figure 3:
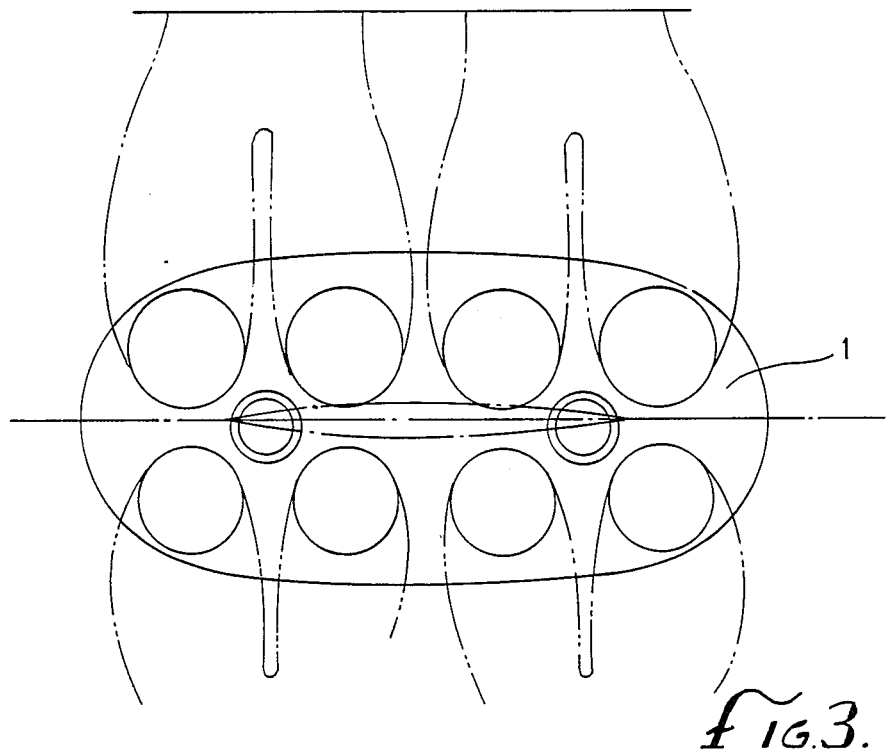
FIG. 3 is a schematic plan representation of the engine of FIG. 1.
Figure 4:
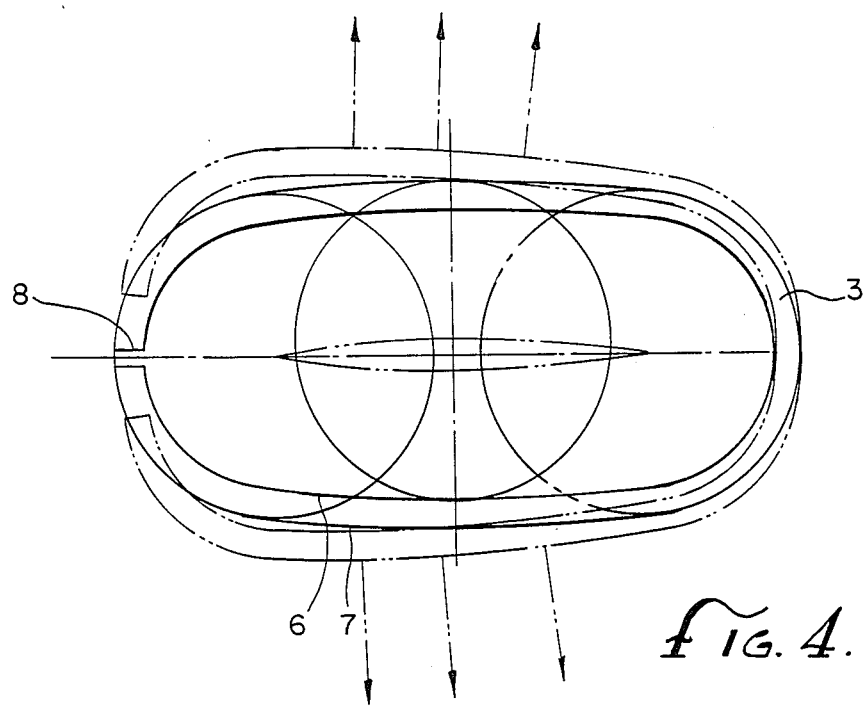
FIG. 4 is a schematic plan representation of a non-circular piston ring for use in the engine of FIG. 1.

As shown in FIGS. 2 and 4, the piston ring has a substantially continuous body having parallel upper and lower surfaces 5 and inner and outer peripheral surfaces 6 and 7, respectively, whose transverse shape is elliptical or one that approximates an ellipse. The blanks for the piston rings, indicated as 4, can be individually formed by casting or pressing, or can be cut in round slices from a hollow casting. The inner surface of each piston ring 3 is precisely finished to the desired shape by broaching or by profile cutting of the blank through the medium of electric discharge cutting. As shown in FIG. 4, the piston rings 3 preferably possess a transverse slot 8 to permit their assembly into the piston grooves 2.

Figure 5:
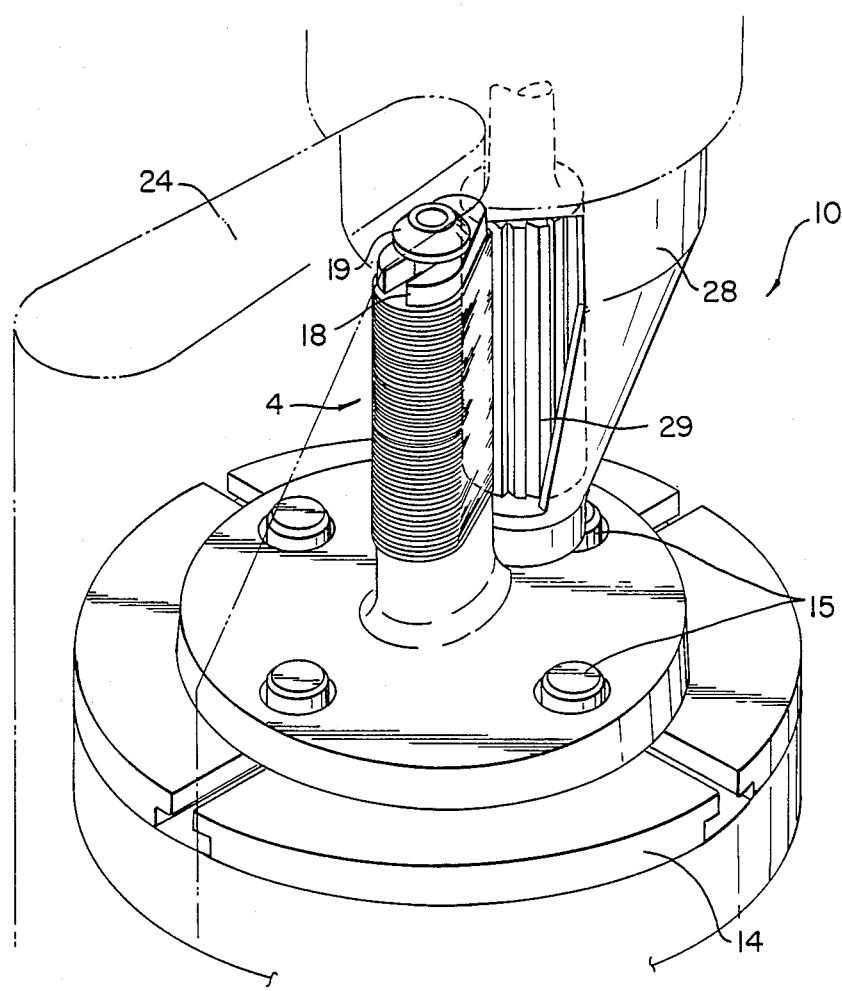
FIG. 5 is a schematic perspective representation of apparatus for machining the external peripheral surface of the piston ring of FIG. 4 according to the invention.
Figure 6:
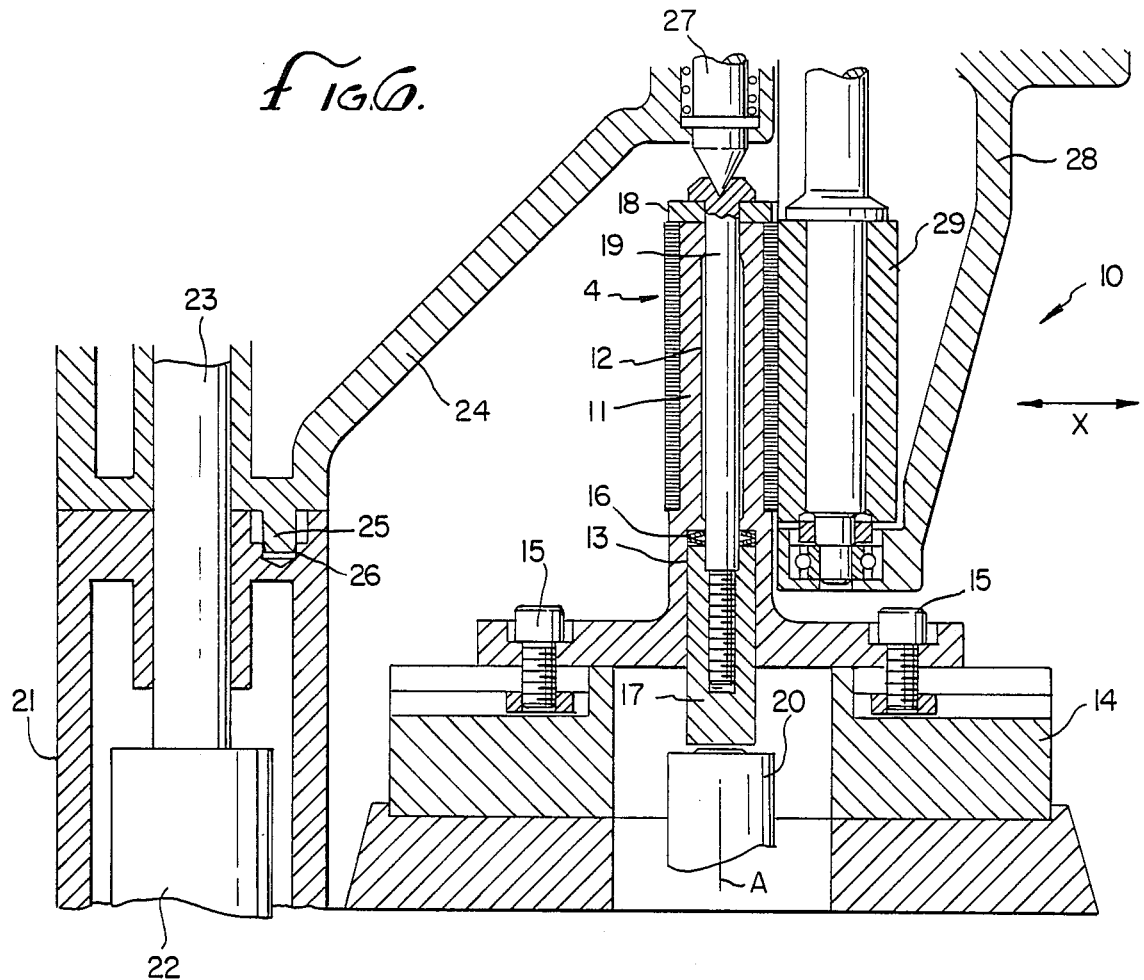
FIG. 6 is a partial sectional elevation of the apparatus of FIG. 5.

The exterior peripheral surface 7 of the blanks 4 forming rings 3 is machined employing apparatus 10 illustrated generally in FIGS. 5 and 6. Such apparatus includes a workpiece supporting jig 11 whose exterior surface conforms, or may be slightly larger for fitting considerations, to the inner surface 6 of the blanks 4. The jig 11 is adapted to mount a plurality of ring blanks 4 arranged in a stack. As shown in FIG. 6, the jig 11, according to one aspect of the invention, is a body having an axial bore 12 and a base that is detachably secured to a turntable 14 by means of bolt 15. The jig 11 is coaxially positioned on the turntable 14 and fixed for rotation therewith. The turntable 14 is adapted to be rotatably driven at a suitable angular velocity by turning and driving mechanisms (not shown).

The jig 11 is attached to the turntable 14 by means of a clamping arrangement which includes a connector 17 adapted to fit into an enlarged diameter portion of the bore 12. The connector 17 threadedly receives the lower end of a headed clamp bolt 19. As shown, springs 16 encircle the bolt 19 and are disposed in a space between the facing surfaces of the connector 17 and the enlarged bore portion 13. The head of the bolt 19 clampingly engages a transversely slotted clamp washer 18 against the upper end of the jig 11 for axially securing the stacked ring blanks 4 thereto.

Mounted on the turntable axis A within space provided therein beneath the connector 17 is a clamp operator comprising hydraulically activated cylinder 20 having an extendable piston adapted to engage the adjacent end of the connector and to move it upwardly against the force of the springs 16. During operation of the apparatus 10 the piston in cylinder 20 is in its retracted position whereby the connector 17 and clamp bolt 19 are urged downwardly by the springs 16 to secure the stacked ring blanks 4 to the jig 11. Actuation of the cylinder 20 extends the piston into engagement with the connector 17 for moving it and the actuated clamp bolt 19 axially upwardly whereupon the clamp washer 18 can be laterally removed from beneath the bolt head and the blanks released from the jig 11.

The stationary support for the turntable 14 includes a laterally spaced upstanding portion 21 within which is positioned a hydraulically operated lifting cylinder having an axially movable and rotatable piston spindle 23. The spindle 23 fixedly secures a work overarm 24 on the base of which is a positioning projection 25 adapted to fit in a recess 26 in the upper face of the support portion 21. When the spindle 23 is extended, the projection is raised from the recess 26, following which, rotation of the spindle 23 permits the overarm to be rotated out of its operational position. The upper surface of the support portion 21 may be formed as a sliding surface to permit the lower end of the projection 25 to engage the surface in order to provide support for the overarm 24 in its non-operational position.

The overarm 24 carries at its upper end a clamp joint in the form of a spring biased, shouldered centering pin 27 having a conical tip adapted for reception in a mating recess in the head of clamp bolt 19. With the overarm 24 in its operation position the pin 27 provides axial support for the upper end of the assembled jig and clamp assembly.

Oppositely adjacent the overarm 24 is a movable toolholder 28 for mounting a milling cutter 29. The toolholder 28 supports the cutter 29 at its ends such that it is caused to rotate about an axis parallel to the axis of the assembled clamp bolt 19. The cutter 29 is rotably driven by a motor (not shown). The toolholder is structurally mounted for movement by mechanism (not shown) in a straight-line direction, indicated as X, perpendicular to the axis A of the clamp bolt 19.

A computer (not shown) controls the driving mechanism of the turntable 14 and the mechanism for moving the toolholder 28. The computer is designed to calculate the turning angle of the turntable 14 and the amount of displacement of the milling cutter axis required to form the desired external peripheral surface 7 on the workpiece blanks 4.

The apparatus 10 disclosed in FIGS. 5 and 6 is operated as follows. With the stack of ring blanks 4 assembled on the jig 11, the milling cutter 29 and turntable 14 are rotatively driven at substantially constant velocities about their respective axes and the computer is activated. A control signal from the computer causes the toolholder 28 to move the milling cutter 29 in the X direction perpendicular to the turntable axis which corresponds to the axis A of the clamp bolt 19. Movement of the toolholder 28 in the X direction is thereafter controlled in response to the calculated position of the exterior peripheral surface of the stacked blanks as they rotate with the turntable 14. Therefore, the exterior peripheral surface 7 of the blanks 4 can be accurately formed to the desired elliptical shape.

Thus, since the inner peripheral surfaces 6 of the blanks 4 for the rings 3 are initially accurately formed and since their surfaces are constrainedly fitted on the jig 11, the processing accuracy of the exterior surface 7 is high.

In the disclosed arrangement, since the position in the X direction of the milling cutter 29 with respect to the axis A of the turntable 14 as the milling cutter and turntable are driven, is controlled by means of numerically controlled operation of the computer to coincide with the desired shape of the exterior surface of the blanks 4, deviation of the desired shape from a circular shape, as for example, to an elliptical shape, can be accurately obtained.

While the above description involves use of a numerically controlled controller for determining the relative position in the X direction of the milling cutter 29 with respect to the central axis of the clamp bolt 19, it should be understood that the invention also contemplates formation of the outer peripheral surface 7 of the piston rings 3 by means of profile copy processing. In such case, a profile copy model formed in a shape identical to the desired shape of the external peripheral surface 7 of the piston ring 3 or in a shape along a curve obtained by joining points spaced a predetermined distance in a direction normal to the curve of the surface 7 can be mounted coaxially by the turntable 14 with a disc having the same diameter as the cutter 29 mounted coaxially thereof. Thus the profile copy is obtained by causing the disc to follow the model.

According to the foregoing description, the exterior peripheral surface of non-circular ring-like blanks can be easily and positively formed with a high degree of accuracy into the desired shape by suitably turning the workpieces about their central axis and moving the rotating cutter for forming the outer surface in the lateral direction in response to rotation of the workpieces. Accordingly, the productivity of piston ring production can be improved by increased accuracy and reduced cost.

Figure 7:
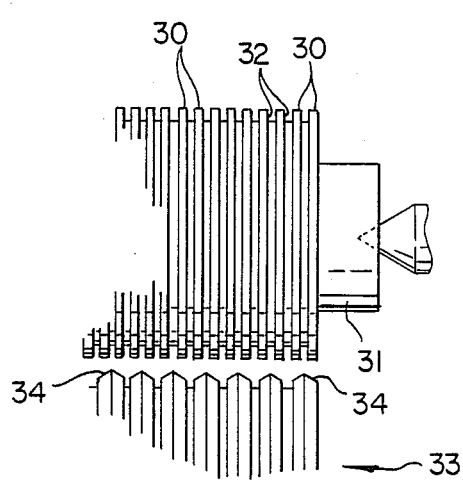
FIG. 7 is a schematic representation of prior art apparatus for machining tapered workpiece surfaces.

The above described apparatus can be readily adapted for forming the exterior peripheral surface of piston rings having conically tapered surfaces rather than cylindrically-formed surfaces, thereby avoiding the need to employ less effective production means, such as that illustrated in FIG. 7. As shown, this prior art means involves the coaxial mounting of the plurality of blanks 30 to be processed on a rotatable mandrel 31 with reduced diameter spacers 32 interposed between each blank and wherein the desired taper is cut into the cylindrical surface by means of a specialized tool 33 having blades 34 with tapered peripheries that may be attached to an engine lathe or the like. Such production means is undesirable for the intended purpose in that, since the spacers 32 are required to separate each blank 30, the time and effort required to install and remove the blanks with respect to the mandrel is objectionable. Also, the need for a specialized cutting tool having blades provided with accurately formed, shape conforming cutting edges, increases tool costs whereby production costs increase.

Figure 8:
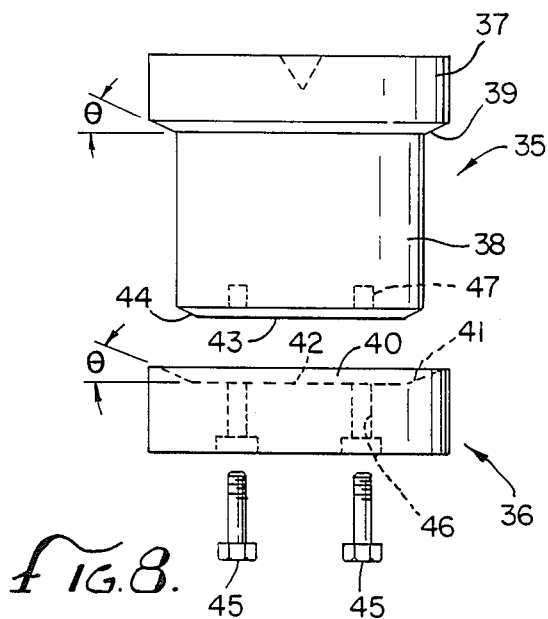
FIG. 8 is an exploded elevational view of one embodiment of a jig for practicing the invention method.

FIG. 8 illustrates an exploded view showing the jig device according to this aspect of the invention as comprising a jig body 35 and a clamp plate 36 adapted for attachment thereto. The jig body 35 has a large diameter portion 37 and a reduced diameter portion 38 extending therefrom. The transverse sectional shape of the reduced diameter portion 38 is intended to correspond substantially with the inner peripheral shape of the ring blanks 4a to be processed. The reduced diameter portion 38 is axially elongated for receiving a plurality of blanks 4a in coaxially stacked array. As the illustrated jig device can accommodate blanks having inner peripheral surfaces that may be either circular or non-circular, the following description will be directed to a processing operation for blanks having a circular inner periphery, it being understood that blanks having a non-circular inner periphery can be similarly processed employing apparatus hereinbefore described.

In the arrangement illustrated in FIGS. 7 through 12, the reduced diameter portion 38 of the jig body 35 is provided with a cylindrical shape having an outer diameter substantially equal to the inner diameter of the ring blanks 4a. The transition portion between reduced diameter portion 38 and large diameter portion 37 is formed as a shoulder 39 having a conically tapered surface facing the reduced diameter portion. The angle $\theta$ that the surface of shoulder 39 makes with respect to a plane normal to the axis of the reduced diameter portion 38 is substantially equal to the angle $\theta$ (FIG. 11) of the taper to be formed on the outer peripheral of the ring blanks 4a. The axial end 43 of the reduced diameter portion 38 is a flat surface extending normal to the axis of the body 35. Its peripheral edge 44 is preferably conically formed with a taper inclined at the angle $\theta$.

Clamp plate 36 has a cylindrical exterior of a diameter substantially the same as the portion 37 of the jig body 35. The upper surface of the clamp plate 36 is provided with a dish-like recess 40, an annular peripheral edge portion of which has a conically tapered surface 41 inclined at the same angle $\theta$ as that of the surface of the jig body shoulder 39. The central portions of the recess 40 presents a circular bottom surface 42 extending normal to the axis of plate 36 and adapted to engage the axial end face 43 of the reduced diameter portion 38 of jig body 35.

The clamp plate 36 is adapted to be detachedly connected to the end of the reduced diameter portion 38 of jig body 35 by means of bolts 45 that extend through holes 46 in the plate and whose threaded ends engage corresponding threads in holes 47 that penetrate the end surface 42 on the jig body 35.

It will be appreciated that, when the clamp plate 36 is attached to the jig body 35, the respective tapered surfaces 39 and 41 on each project radially outwardly from the peripheral surface of the reduced diameter portion 38 and in facing parallel relation to each other.

In processing the ring blanks, first, as shown in FIG. 9, a plurality of blanks 4a, having unprocessed, generally cylindrical outer peripheral surfaces 48 are stacked upon the reduced diameter portion 38 of the jig body 35. Following this, the clamp plate 36 is attached by means of bolts 45 to the end of the jig body 35. Thus, the stacked ring blanks 4a are clamped between the opposed, conically tapered surfaces 39 and 41 whereupon, as shown in FIG. 10, the blanks 4a are caused to deform resiliently into a conical shape conforming with the shape of the surfaces 39 and 41.

The taper angle $\theta$, shown exaggeratedly in the respective drawing figures is in practice, an angle of from 1 to 3 degrees. Accordingly, due to the resiliency in the axial direction of the ring blanks 4a, the required deformation is readily achieved and, as shown best in FIG. 11, when the deformation is accomplished, the outer peripheral surface 50 of each blank 4a is caused to be inclined at the angle $\theta$ with respect to a line parallel to the axis of each blank. The entire assemblage of ring blanks 4a at this stage of the procedure presents a serrated outer peripheral surface.

Following this, the assembled jig carrying the plurality of deformed blanks 4a is mounted on a turntable, such as that shown at 14 in FIGS. 5 and 6, for rotation about the central axis, indicated as 1 in FIG. 10, and rotatingly brought to bear against the cutting edge of milling cutter 51, or the like, having a rotation axis L' parallel to the rotation of the turntable-mounted jig axis L. The outer peripheral surfaces 50 of the stacked blanks 4a so-machined becomes a cylindrical surface, as shown by the dotted line C in FIG. 11. This cylindrical surface is inclined at the angle $\theta$ to the original outer peripheral surfaces of the blanks and to their upper surfaces 52.

Removal of the machined ring blanks 4a from the jig, due to the resiliency of their material returns them to their original, flat shape as shown in FIG. 12. The original cylindrical outer peripheral surface 50 of FIG. 11 becomes a surface 50' that is conically tapered at the angle $\theta$.

FIG. 13 illustrates another embodiment of a jig structure useful in the described invention. In this embodiment, the ring blanks 4a are mounted on a jig arrangement in two groups, indicated as 4a' and 4a''. Reference numeral 35a indicates a jig body similar to the body 35 in the previously described embodiment. To the jig body 35a is clamped a second jig body 35b provided on its upper end with an enlarged diameter portion 37a containing a conically tapered, dish-like recess similar to the recess 40 of the previously described clamp plate 36. The ring blanks 4a are clamped and deformed between the conically tapered surfaces 39a and 41a on the respective jig bodies. Also, the jig body 35b is provided with a conically tapered surface 39b similar to the surface 39 of the previously described jig body and mounts a clamp plate 36' that is substantially the same as the clamp plate 36. The other group of ring blanks 4a" is mounted between the conically tapered surfaces 39b and 41 on the enlarged diameter portion 37b and the clamp plate 36, respectively. Clamping pressure for the assemblage is provided by the axial force developed between an axially disposed headed clamp bolt 53 whose shaft extends through holes in the members 35a and 35b and a bolt 8' similar to the previously described bolts 8, that threadedly engages the end of the clamp bolt 53. By arranging the ring blanks 4a in two groups, as shown, a greater number of blanks can be readily and more positively deformed.

As previously mentioned, the above described invention is equally adaptable to accommodate non-circular ring blanks for machining of their exterior peripheral surfaces by means of the apparatus described in FIGS. 1 through 6. In such case, the profile shapes in the transverse section of the reduced diameter portion 38 of the jig body 35 and the conically tapered surfaces 39 on the jig body 35 and 41 on the clamp plate 36, are provided with a transverse shape conforming with that of the ring blank to be processed. The cutting process may be performed by a numerically controlled milling cutter as described in connection with FIGS. 1 to 6 hereof wherein, as shown in FIG. 10, the rotational axis L' of the cutter 51 may be moved transversely forward and backward with respect to the axis L as shown by the arrow "a". Alternatively, of course, the axis L could be similarly moved with respect to the axis L'.

From the foregoing description, it will be appreciated that the present invention provides improved means for machining the exterior peripheral surfaces of large numbers of piston ring blanks on a production scale and in a manner that positively insures the accuracy of the surface being unachieved.

It will be understood that various changes in the details, materials and arrangement of parts which have been herein dboltibed and illustrated in order to explain the nature of the invention, may be made by those skilled in the art within the principle and scope of the invention as expressed in the appended claims.

What is claimed is:

1. Apparatus for machining the exterior peripheral surface of a non-circular, ring-like workpiece, comprising:
    a rotatable base;
    a jig upstanding from said base and attached for rotation therewith, said jig containing means for mounting a plurality of workpieces in coaxial stacked array including an axially elongated body having a transverse sectional shape conforming generally to the transverse sectional shape of the internal periphery of said workpieces, means forming a workpiece receiving shoulder axially spaced from one end of said body, a locking collar having a transverse slot and a bearing surface in facing relation to said shoulder;
    means for detachedly securing said locking collar to said body including a bore through said jig body, an elongated clamp bolt extending through said bore, said clamp bolt having a head at one end and a detachable nut at the other end for axially securing said collar to said body, the axial length of said bolt being longer than the effective length of said bore whereby said clamp bolt is axially movable within said bore, spring means for biasing said clamp bolt to secure said collar with respect to said bore, and means for selectively axially moving said clamp bolt against the force of said spring for release of said collar from said body,
    a tool having a working edge adapted to bear against the exterior surface of said workpieces;
    a toolholder mounting said tool, said toolholder being movable in a direction substantially perpendicular to the exterior surface of said workpieces;
    means for rotating said base;
    means for moving said toolholder; and
    means for controlling the transverse movement of said toolholder in response to the angular displacement of said workpieces during rotation of said base whereby the working edge of said tool will define the exterior of said workpieces.

2. The apparatus according to claim 1 including means for centering said jig on said rotatable base, said means comprising:
    an overarm support containing a locating pin in overlying relation to said clamp bolt;
    said pin having a locating tip coaxially disposed with relation to the rotation axis of said rotatable base; and
    means on the adjacent end of said clamp bolt for receiving said tip.

3. The apparatus according to claim 2 in which said pin is axially movable in said support; and
    spring means for biasing said tip against said clamp bolt.

4. The apparatus according to claim 3 in which said overarm support is displaceable with respect to said jig body; and
    means for displacing said support for removing said locating pin from overlying relation to said clamp bolt.

* * * * *